(No Model.)
R. P. FARIES.
ELECTRIC MOTOR TRUCK.
No. 445,051. Patented Jan. 20, 1891.
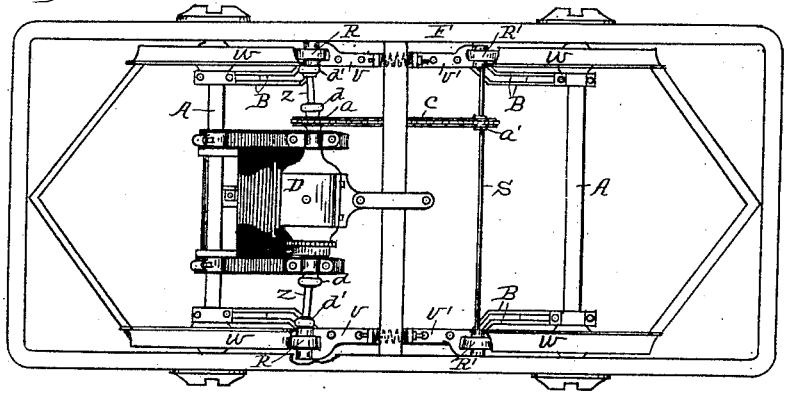
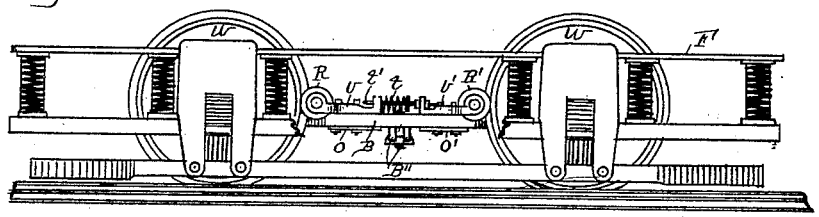
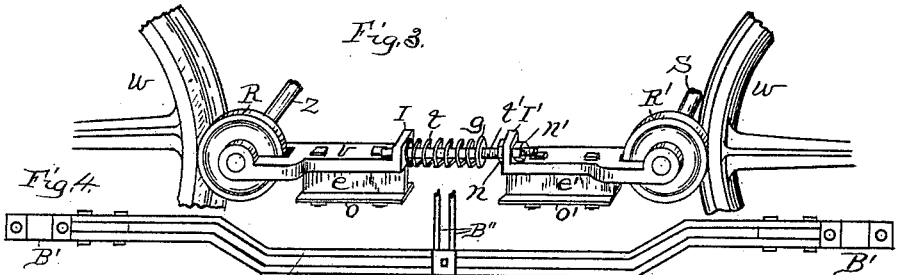
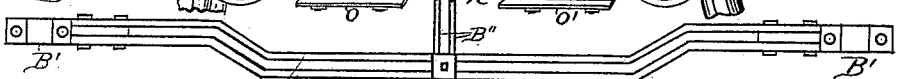
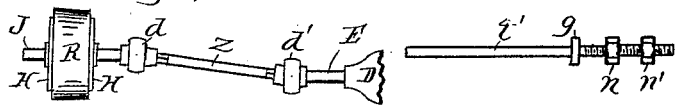
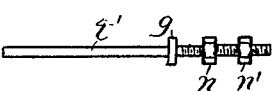
Witnesses,
N. B. Hagin
W. C. Hutchins
Inventor.
Royal P. Faries
By Wm. J. Hutchins
Atty.

UNITED STATES PATENT OFFICE.

ROYAL P. FARIES, OF WICHITA, KANSAS.

ELECTRIC-MOTOR TRUCK.

SPECIFICATION forming part of Letters Patent No. 445,051, dated January 20, 1891.

Application filed September 23, 1890. Serial No. 365,876. (No model.)

*To all whom it may concern:*

Be it known that I, ROYAL P. FARIES, a citizen of the United States of America, residing at Wichita, in the county of Sedgwick and State of Kansas, have invented certain new and useful Improvements in Electric-Motor Trucks, of which the following is a specification, reference being had therein to the accompanying drawings and the letters of reference thereon, forming a part of this specification, in which—

Figure 1 is a top plan of an electric-motor truck having my invention applied thereto. Fig. 2 is a side elevation of the same. Fig. 3 is a detail perspective of a portion of the same. Fig. 4 is a detail top plan of a pair of beams thereof. Fig. 5 is a detail plan of one of the friction-wheels thereof and of the shafts and universal couplings connected therewith, and Fig. 6 is a detail plan of one of the spring-bars thereof.

This invention relates to certain improvements in the mechanism for propelling the traveling wheels of an electric-motor truck, which improvement consists in arranging friction wheels or rolls to yieldingly bear against the rim of the truck traveling wheels and in flexibly connecting said friction wheels or rolls with the armature-shaft of the electric motor of the truck in such manner that the rotary movement of the armature-shaft will impart motion to the said friction wheels or rolls, and by means of their frictional contact with the truck traveling wheels propel them and cause the truck to advance, and which improvements are fully set forth and explained in the following specification and claims.

The object of this invention is to dispense with the use of toothed gearing commonly used for the purpose of propelling the truck, and also to avoid the usual noise which is produced by the use of toothed gearing.

Referring to the drawings, W represents the truck traveling wheels, and A the axles thereof, which support the usual frame for supporting the car, (not necessary to be shown,) which frame is represented at F, and D represents an electric motor of the ordinary pattern, which is supported by and carried with the truck.

B and B represent two pair of parallel beams, each provided with an axle bearing or box B' (see Fig. 4) at each end, and are attached to the truck by arranging these bearings B' to inclose the axles A in such manner that one of the beams will be at each side of the truck with the bearings B' adjacent the truck-wheel hubs, and the center portion of said beams is bent to one side, so as to form a guideway for the support of sliding heads between the wheels W at each side of the truck.

V and V are sliding heads, made in pairs, right and left, one for each side of the truck, and each forked at one end, which forked portions terminate with shaft-bearings, and each support a friction wheel or roll R on a short shaft (shown at J in Fig. 5) between said fork-bearings, and each is further provided with depending webs *e*, and are respectively seated upon the beams B, with their web *e* between the beams, and held so they may slide along on the beams, but not become disengaged therefrom, by means of the bottom plates *o*, as shown, and when thus arranged the wheels or rolls R may be brought to bear against the truck-wheels W, and their shafts J will be in line, or nearly so, with the armature-shaft of the motor D, and each roll-shaft is connected with its respective end of said armature-shaft through the agency of the universal couplings *d* and *d'* and the intermediate shaft Z, which is squared at each end and fitted into square sockets of the couplings, which connections are, by the use of said couplings, flexible and permit the wheels or rolls R to be moved to or from the wheels W, and at the same time be driven by the electric motor. In Fig. 5 the motor D is shown only in part and the armature-shaft is represented at E and coupled with the roll R in the manner described. V' V' are similar but opposite sliding heads, supporting like friction wheels or rolls R' in like manner, and held and arranged to slide on the beams B in like manner as heads V V, and are arranged so that the wheels or rolls R' will bear against their respective truck-wheel W.

The shaft for supporting the wheels or rolls R' is shown at S, and extends across the truck and supports a wheel or roll R' on each end, and is driven to rotate said wheels or rolls through the agency of a sprocket-chain and wheel mechanism from the armature-shaft of the motor D, which mechanism consists of a sprocket-wheel $a$, fixed to one end portion of the armature-shaft, a sprocket-wheel $a'$, fixed on the shaft S, and a chain $c$, passing about said wheels, as shown in Fig. 1. The heads V have at their rear end portion an upturned portion I, (see Fig. 3,) and the heads V' have a like upturned portion I', which are each perforated and receive in their perforations the spring-bars $t'$, which bars have respectively sleeved thereon the springs $t$, and are each provided with an annular flange $g$, which confine the springs between said flanges and the heads V, and are further screw-threaded on one end and provided with the nuts $n$ and $n'$, one each side of the upturned portions I' of heads V', and by means of said nuts the bars $t'$ may be adjusted to increase or lessen the tension of springs $t$ by lessening or increasing the space between the flanges $g$ and heads V, and by means of such spring tension between heads V V' they are yieldingly held, so that their wheels or rolls R R' will yieldingly bear against their respective wheel W of the truck, and their degree of frictional contact regulated by the adjustment of the spring-bars $t'$.

The four friction wheels or rolls are shown and deemed necessary in trucks which travel inclined roads; but in use on level roads two of said wheels or rolls may be dispensed with. Should the rolls or wheels R' R' be dispensed with, they are removed from the truck, together with their shaft and the sprocket-wheels $a$ $a'$ and chain $c$, and their heads or an equivalent therefor fastened to the beams B, so as not to slide, but simply support the springs, and should the rolls or wheels R R be dispensed with they are removed from the truck, together with their shafts J and Z and couplings $d$ $d'$, and their heads or an equivalent fastened to the beams B in like manner and for the purpose described of heads V' V', when the remaining rolls or wheels will be driven by the armature-shaft through the agency of the sprocket-wheels and chain, as before described.

As a means for preventing the side beams B B from twisting or assuming improper position when under strain of operation of the friction-wheels, I have provided a pair of cross-beams, (shown at B'' in Figs. 2 and 4,) which cross the truck and are clipped at each end to the said beams, as shown.

The wheels or rolls R R' may be of solid metal or of a combination of metal and rubber, the rubber forming the peripheral portion, and in such construction the rubber will be held as a rim between and by means of a pair of side plates or disks, (shown at H H in Fig. 5.)

The particular manner described for supporting the friction-wheels is not deemed essential, only so they are yieldingly held in contact with the traveling wheels W and properly and firmly supported; but, however, the manner shown is a very desirable and substantial way and carries the said friction-wheels with the truck-wheels independent from the truck-frame, and is therefore free from all movement of the attached car.

Having thus described my invention, what I claim as new and useful, and desire to secure by Letters Patent, is as follows:

1. The combination, in an electric-motor truck, with the armature-shaft of the electric motor and the traveling wheels of the truck, of the friction wheels or rolls yieldingly held in contact with the truck-wheels and flexibly connected with and arranged to be driven by the said armature-shaft, substantially as and for the purpose set forth.

2. The combination, in an electric-motor truck, with the armature-shaft of the electric motor and the traveling wheels of the truck, of the friction-wheels R, having the shafts J and supported by means of sliding heads in such manner as to yieldingly bear against the traveling wheels of the truck from the influence of springs, and the universal couplings and intermediate shafts for connecting said friction-wheels and armature-shaft, substantially as and for the purpose set forth.

3. The combination, in an electric-motor truck, with the armature-shaft of the electric motor and the traveling wheels of the truck, of the friction wheels or rolls supported by means of the sliding heads and given yielding pressure against the traveling wheels by means of springs bearing against said heads, the couplings $d$ $d'$ and shafts Z Z for connecting the friction wheels or rolls in line with the armature-shaft with said shaft, and the sprocket-wheels $a$ $a'$, the chain $c$, and shaft S for connecting the opposite wheels or rolls with said armature-shaft, in the manner substantially as and for the purpose set forth.

ROYAL P. FARIES.

Witnesses:
WM. J. HUTCHINS,
N. B. HAGIN.